United States Patent [19]

Jantzen

[11] Patent Number: 5,686,365
[45] Date of Patent: Nov. 11, 1997

[54] METHOD FOR DISSOLUTION AND STABILIZATION OF SILICA-RICH FIBERS

[75] Inventor: Carol M. Jantzen, Aiken, S.C.

[73] Assignee: United States Department of Energy, Washington, D.C.

[21] Appl. No.: 821,653

[22] Filed: Jan. 16, 1992

[51] Int. Cl.$^6$ .................................................. C04B 41/53
[52] U.S. Cl. .............................. 501/39; 501/12; 65/901; 65/31; 134/2; 134/42; 588/1; 588/11
[58] Field of Search ............................ 65/901, 31; 134/2, 134/42; 501/39, 12; 588/1, 11

[56] References Cited

U.S. PATENT DOCUMENTS

| | | | |
|---|---|---|---|
| 4,514,329 | 4/1985 | Wakabayashi et al. | 252/629 |
| 4,657,875 | 4/1987 | Nakashima et al. | 501/39 |
| 4,808,233 | 2/1989 | Pfannkoch | 134/2 |
| 4,995,916 | 2/1991 | Meikrantz et al. | 134/22.16 |

FOREIGN PATENT DOCUMENTS 62-270424  11/1987  Japan .

OTHER PUBLICATIONS

Chemical Abstracts vol. 104, No. 14 104:112265n (1986) No Month Avail.

Chemical Abstracts vol. 114 No. 16 114:149895a (1991) No Month Avail.

*Primary Examiner*—David Brunsman
*Attorney, Agent, or Firm*—Harold M. Dixon; William R. Moser; Paul A. Gottlieb

[57] ABSTRACT

A method for dissolving silica-rich fibers such as borosilicate fibers, fiberglass and asbestos to stabilize them for disposal. The method comprises (1) immersing the fibers in hot, five-weight-percent sodium hydroxide solution until the concentration of dissolved silica reaches equilibrium and a only a residue is left (about 48 hours), then immersing the residue in hot, five-weight-percent nitric acid until the residue dissolves (about 96 hours). After adjusting the pH of the dissolved fibers to be caustic, the solution can then be added to a waste vitrification stream for safe disposal. The method is useful in disposing contaminated HEME and HEPA filters.

20 Claims, 1 Drawing Sheet

METHOD FOR DISSOLUTION AND STABILIZATION OF SILICA-RICH FIBERS

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to the dissolution of silica-rich fibers such as borosilicate glass, fiberglass and asbestos. More particularly, the present invention relates to preparation of contaminated and hazardous silica-rich fibers for stabilization and disposal.

2. Discussion of Background

Silica-rich fibers include glass fibers, borosilicate glass fibers, fiberglass and asbestos. These types of fibers are found in insulation and filter material. In particular, so-called HEME (High Energy Mist Eliminator) and HEPA (High Energy Particulate Absorber) filters are made of borosilicate glass fibers, the latter with a binder such as polyurethane foam, the former without a binder. These filters are usually encased in steel frames.

HEME and HEPA filters, because they are highly efficient, are often used when contaminants are present since it is then so much more important to cleanse the air of the contaminants before venting it to the atmosphere. Periodically, however, the filters themselves must be replaced and the used filters properly disposed of. Proper disposal is frequently made more complicated by the nature of the contaminants adsorbed by the filter material.

For example, in a radioactive environment such as in a facility for processing radioactive waste or spent nuclear fuel, HEPA and HEME filters can become contaminated by radioisotopes such as cesium-137 and strontium-90, both having relatively longer decay half-lives and being known carcinogens. If the concentrations of these and other radioisotopes present on the filters are sufficiently great, the filters cannot be disposed of as "low-level radioactive waste" but must meet requirements for disposal as "high-level radioactive wastes". Currently, high level radioactive waste is prepared for disposal by encapsulating it in glass to stabilize it for long term storage until radioactive decay reduces the primary hazard of the waste—radioactivity—to innocuous levels. If the contaminant-bearing filter material can be dissolved, it could be incorporated into the predominantly silica matrix of the bulk glass. A filter frame, if present, can then be decontaminated and disposed of as low-level radioactive waste or perhaps reused. Dissolution of the glass fibers of the filters would decrease the volume of material requiring disposal and simplify disposal because no additional techniques would be needed to stabilize and encapsulate the fibers for disposal.

However, bulk glass is not easily dissolved. It is this very characteristic of glass that recommends it as a matrix for the long term encapsulation of radionuclides.

In U.S. Pat. No. 4,995,916 issued February 1991 to Meikrantz et al., there is disclosed a process for decontaminating radioactively contaminated filters made of phenolic resins, rather than borosilicate glass, and recovery of hazardous material attached thereto. This process begins with dissolution of the filter material in a strong acid (8–12 M nitric acid) at elevated temperature to solubilize the filter material, followed by recovery of the contaminant of interest using standard chemical techniques.

However, there remains a need for a process for solubilizing contaminated, hazardous silica-rich fibers, especially for use in preparation of HEME and HEPA fiberglass filter materials for disposal.

SUMMARY OF THE INVENTION

According to its major aspects and broadly stated, the present invention is a method for dissolving silica-rich fibers, such as borosilicate fibers, fiberglass and asbestos. The method comprises the steps of (1) making a first mixture of sodium hydroxide and water; (2) immersing the fibers in the first mixture; (3) maintaining the fibers in this first mixture until the concentration of silica approaches equilibrium and only a gelatinous residue of the fibers remains; (4) removing the residue from the first mixture; (5) making a second mixture of nitric acid and water; (6) immersing the residue in this second mixture; and (7) maintaining the residue in the second mixture until it dissolves.

The first mixture is at least two percent by weight sodium hydroxide, but preferably not more than 30 weight percent, most preferably approximately five weight percent. The second mixture comprises at least one weight percent but preferably approximately five percent by weight nitric acid. Both mixtures are heated to approximately at least their respective boiling temperatures and held at those temperatures for approximately 48 hours and 96 hours, respectively. When dissolution is complete, the pH of the solution may be adjusted with hot, five-weight-percent sodium hydroxide to be caustic so that it is compatible with vitrification process input streams.

An important feature of the present invention is the use of a strong, hot, basic mixture followed by a strong, hot acidic mixture. The strong base breaks down the silica fiber matrix to a gel; the strong acid dissolves the gel. The result is complete dissolution of the fibers, as well as the typical binders that are used in the making of some filters. Completely or substantially completely dissolved fibers allows feeding the solution along with the input stream to a vitrification process input stream where the silica fiber material can be formed into non-respirable bulk glass. Especially in the case of fiberglass, the disposal of which is subject to stringent regulatory control, having an effective dissolution method that leads directly to a long term stabilization process is a distinct advantage of the present method.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

The present invention is a method for dissolving silica-rich fibers. Silica-rich fibers include two types that are especially important to be able to dispose of properly and their dissolution greatly facilitates disposal because the dissolved glass fibers can be vitrified in a non-respirable bulk glass matrix made at least in part of the chemical constituents in the fibers themselves. These fibers are borosilicate glass, as is used in HEPA and HEME filters that may have been used to filter radioactive or chemical contaminants from the exhaust of a laboratory or other facility where such contaminants are encountered, fiberglass and asbestos, formerly widely-used insulating material.

According to the dissolution process, the fibers are immersed in a first mixture of water and hot sodium hydroxide solution. Preferably, the sodium hydroxide solution contains at least two percent by weight sodium hydroxide in water, more preferably between two and thirty weight percent and most preferably approximately 5 weight percent sodium hydroxide. Also preferably, the solution is heated to approximately at least the boiling temperature of the solution (approximately 104° C.).

Figure 1:
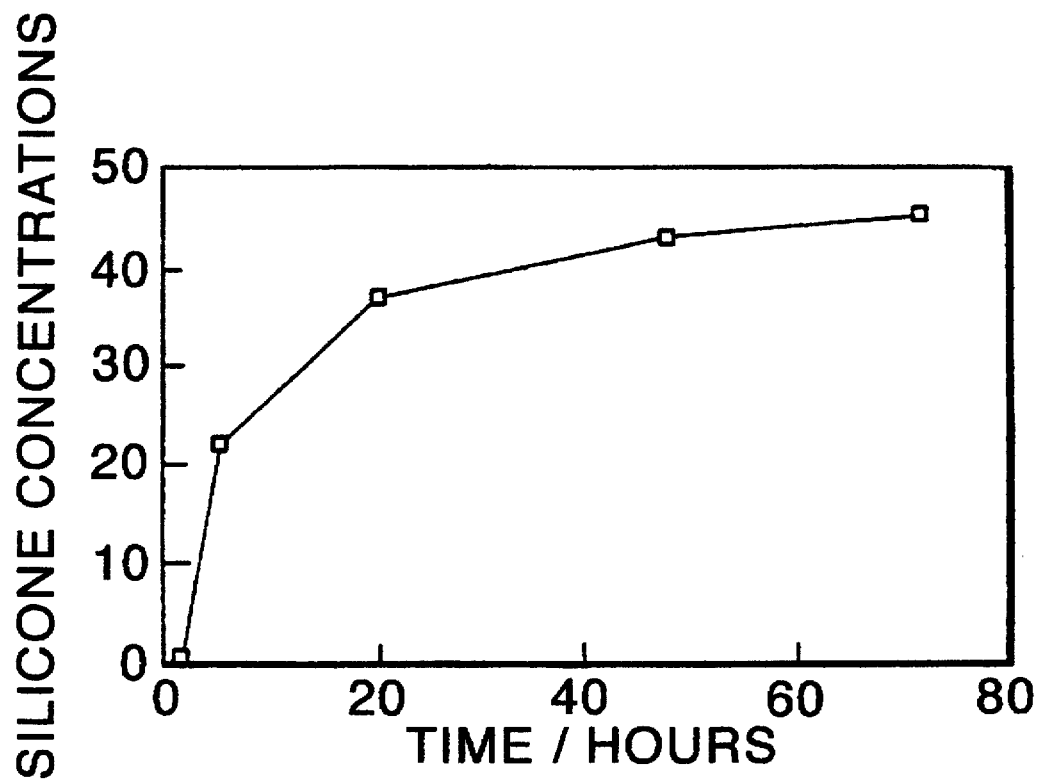
FIG. 1 is a graph showing silica concentration versus dissolution time in the basic mixture.

The fibers should remain immersed in the hot sodium hydroxide solution until the concentration of dissolved silica reaches equilibrium at which time the fibers have become gelatinous, typically about 48 hours. FIG. 1 is a graph depicting the concentration of silica in sodium hydroxide solution versus time. About 50% of the fibers are dissolved in this first part of the method.

Figure 2:
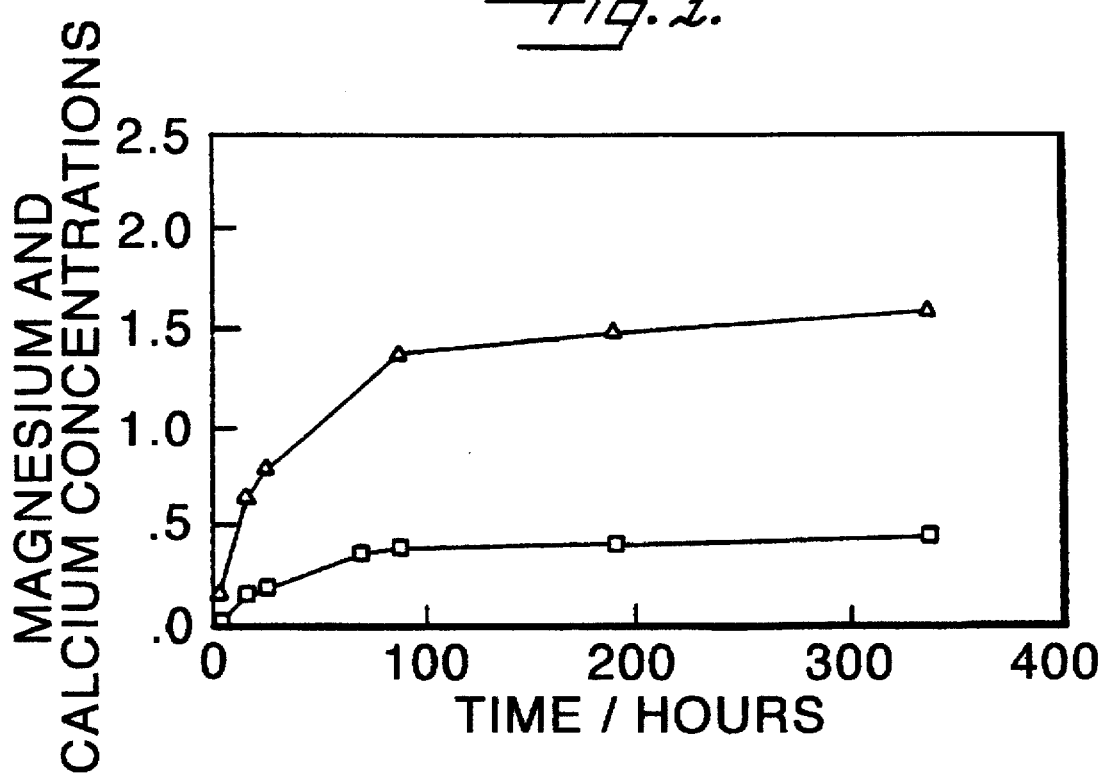
FIG. 2 is a graph showing calcium and magnesium concentration versus dissolution time in the acidic mixture, indicating the rate at which the calcium and magnesium of the silica gel break down.

After immersion in sodium hydroxide, the residue of the fibers is immersed in a solution of hot nitric acid, preferably at least one percent nitric acid by weight and most preferably approximately five percent. This second solution is also preferably heated to its boiling temperature (approximately 103° C.) and maintained in the hot nitric acid solution until dissolution is complete, usually after the calcium and magnesium concentrations in the solution reach equilibrium (approximately 96 hours). FIG. 2 is a graph of calcium and magnesium concentrations in the nitric acid solution versus time.

Optionally, for feeding the dissolved fibers into a vitrification system, it may be necessary to adjust the pH to be caustic so that it is compatible with the balance of the input feed. Adding a five weight percent sodium hydroxide solution and soaking for four hours raises the pH to the desired levels. The sodium hydroxide solution should also be at or near its boiling temperature.

If the fibers were part of HEME or HEPA filters, the steel frames can be removed from the solution and rinsed with water. The cesium-137, strontium 90 and any transuranic wastes follow the dissolved silica fibers to the vitrification system melter.

It will be apparent to those skilled in the art that many changes and substitutions can be made to the preferred embodiment herein described without departing from the spirit and scope of the present invention as defined by the appended claims.

What is claimed is:

1. A method for dissolving silica-rich fibers, said method comprising the steps of:

making a first mixture of sodium hydroxide and water;
immersing said fibers in said first mixture;
maintaining said fibers in said first mixture until the concentration of silica in said first mixture approaches equilibrium and a residue of said fibers remains;
removing said residue from said first mixture;
making a second mixture of nitric acid and water;
immersing said residue in said second mixture; and
maintaining said residue in said second mixture until said residue dissolves.

2. The method as recited in claim 1, wherein said first mixture comprises at least two percent by weight sodium hydroxide.

3. The method as recited in claim 1, wherein said first mixture comprises approximately five percent by weight sodium hydroxide.

4. The method as recited in claim 1, wherein said second mixture comprises at least one percent by weight nitric acid.

5. The method as recited in claim 1, wherein said second mixture comprises approximately five percent by weight nitric acid.

6. The method as recited in claim 1, further comprising the step of heating said first mixture until at least approximately at boiling temperature and maintaining said temperature until said residue is to be removed.

7. The method as recited in claim 1, further comprising the step of heating said second mixture until at least approximately at boiling temperature and maintaining said temperature until said residue is dissolved.

8. The method as recited in claim 1, further comprising the step of adjusting the pH of said dissolved residue to be caustic.

9. A method for dissolving silica-rich fibers, said method comprising the steps of:

making a first mixture of sodium hydroxide and water;
immersing said fibers in said first mixture;
heating said first mixture to a first temperature;
maintaining said fibers in said first mixture at said first temperature until the concentration of silica in said first mixture approaches equilibrium and a residue of said fibers remains;
removing said residue from said first mixture;
making a second mixture of nitric acid and water;
immersing said residue in said second mixture;
heating said second mixture to a second temperature; and
maintaining said residue in said second mixture at said second temperature until said residue dissolves.

10. The method as recited in claim 9, wherein said first mixture comprises at least two percent but not more than thirty percent by weight sodium hydroxide.

11. The method as recited in claim 9, wherein said first mixture comprises approximately five percent by weight sodium hydroxide and said second mixture comprises approximately five percent by weight nitric acid.

12. The method as recited in claim 9, wherein said first mixture comprises at least two percent but not more than thirty percent by weight sodium hydroxide and said second mixture comprises approximately five percent by weight nitric acid.

13. The method as recited in claim 9, wherein said first temperature is approximately the boiling temperature of said first mixture.

14. The method as recited in claim 9, wherein said second temperature is approximately the boiling temperature of said second mixture.

15. The method as recited in claim 9, wherein said first temperature is approximately the boiling temperature of said first mixture and said second temperature is approximately the boiling temperature of said second mixture.

16. A method for preparing a filter containing silica-rich fibers for disposal, said method comprising the steps of:

making a first mixture of sodium hydroxide and water;

immersing said filter in said first mixture;

heating said first mixture to approximately at least the boiling temperature of said first mixture;

maintaining said filter in said first mixture at said boiling temperature until the concentration of silica in said first mixture approaches equilibrium and a residue of said fibers remains;

removing said residue from said first mixture;

making a second mixture of nitric acid and water;

immersing said residue in said second mixture;

heating said second mixture to approximately at least the boiling temperature of said second mixture; and maintaining said residue in said second mixture at said second temperature until said residue dissolves.

17. The method as recited in claim 16, further comprising the step of adjusting the pH of said dissolved residue to be caustic.

18. The method as recited in claim 16, further comprising the steps of:

making a third mixture of sodium hydroxide and water; and adjusting the pH of said dissolved residue with said third mixture so that said dissolved residue is caustic.

19. The method as recited in claim 16, wherein said first mixture comprises at least two percent but not more than thirty percent by weight sodium hydroxide and said second mixture comprises approximately five percent by weight nitric acid.

20. The method as recited in claim 16, further comprising the step of vitrifying said dissolved residue into bulk glass for safe disposal.

* * * * *